J. P. Culver,
Hook & Eye.
No. 45979.    Patented Jan. 24, 1865.
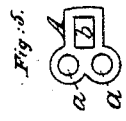
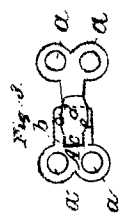
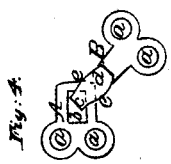
Witnesses:    Inventor:

UNITED STATES PATENT OFFICE.

JOHN P. CULVER, OF NEW YORK, N. Y.

IMPROVEMENT IN HOOKS AND EYES.

Specification forming part of Letters Patent No. 45,979, dated January 24, 1865.

*To all whom it may concern:*

Be it known that I, JOHN P. CULVER, of the city, county, and State of New York, have invented a new and useful Improvement in Hooks and Eyes for Fastening Garments; and I do hereby declare that the following is a full, clear, and exact description thereof, which will enable others to make and use the same, reference being had to the accompanying drawings, forming a part of this specification, in which—

Figure 1 is an inside face view of a hook and eye, showing them extended as by the tension of the garment; Fig. 2, an edge view corresponding with Fig. 1; Fig. 3, an inside face view showing the relation of the hook and eye when passed directly toward each other; Fig. 4, an inside face view showing the oblique position to which the hook must be brought before it can be disconnected from the eye; Fig. 5, a face view of the eye; Fig. 6, an inside face view of the hook.

Similar letters of reference indicate like parts.

The common hook and eye are very liable to become unfastened in case of any relaxation of the tension of the garment produced by the movements of the body or by other causes. Many modes of preventing this have been invented, but all have been more or less objectionable on account of their making the hook and eye more complicated and difficult to manufacture.

The object of my invention is to make the fastening secure without making the hook and eye any more complicated or increasing its cost; and to this end it consists in the combination of a bill broader than the bent portion of the hook and an opening in the eye narrower than the bill, which prevents the withdrawal of the bill without bringing the hook to an oblique position relatively to the eye.

The best material for making the hook and eye is sheet metal of suitable thickness. Each is punched out to a suitable form, with holes $a\,a$, through which to sew them on the garment, and the blank to form the hook is afterward bent into the requisite form. The opening $b$ of the eye A, which receives the hook, is made parallel-sided, and a little wider than the bent portion $c$ of the hook B, as shown at $e$ in Figs. 1, 3, and 4, to permit the said portion of the hook to work freely therein, but the bill $d$ commences to widen at a short distance from the bend wider than the opening $b$, as shown in the above-mentioned figures, so that it cannot pass through the said opening by any direct longitudinal movement of the hook or eye, such as is produced by the relaxation of the tension of the garment, nor without the hook and eye being brought into oblique positions relatively to each other, as shown in Fig. 4, into which positions they can only be brought by design; but to disconnect them they are brought into these positions, and on the hook being pushed forward from such position it will pass easily out of the eye, as the common hook from the common eye.

Instead of sheet metal, wire may be used for the manufacture of my improvement.

I claim as my invention and desire to secure by Letters Patent—

A hook and eye combining the widening $e$ of the bill of the hook with the narrower opening $b$ of the eye, substantially as and for the purpose herein specified.

JNO. P. CULVER.

Witnesses:
 JAMES P. HALL,
 M. M. LIVINGSTON.